(No Model.)

W. C. B. HUMMEL.
SAW SWAGE.

No. 324,701.   Patented Aug. 18, 1885.

WITNESSES:
W. W. Hollingworth
W. X. Stevens.

INVENTOR:
Wm. C. B. Hummel
BY Munn & Co.
ATTORNEYS.

United States Patent Office.

WILLIAM C. B. HUMMEL, OF WINFIELD, WEST VIRGINIA, ASSIGNOR OF TWO-THIRDS TO RUFUS SWITZER AND L. A. CHRISTY, OF SAME PLACE.

SAW-SWAGE.

SPECIFICATION forming part of Letters Patent No. 324,701, dated August 18, 1885.

Application filed October 14, 1884. (No model.)

*To all whom it may concern:*

Be it known that I, WILLIAM C. B. HUMMEL, a citizen of the United States, residing at Winfield, in the county of Putnam and State of West Virginia, have invented certain new and useful Improvements in Saw-Swages, of which the following is a description.

This invention relates to that class of devices which are used for upsetting the points of saw-teeth to broaden the points; and its object is to guide the swage used for that purpose relatively to the plane of the saw, so that the action of the swage shall not tend to cant the tooth to either side, and to facilitate the operation, so that the swage may be instantly placed properly on the tooth without special care on the part of the operator.

To this end my invention consists in the construction and combination of parts forming a saw-swage, hereinafter described and claimed, reference being had to the accompanying drawings, in which—

Figure 1:
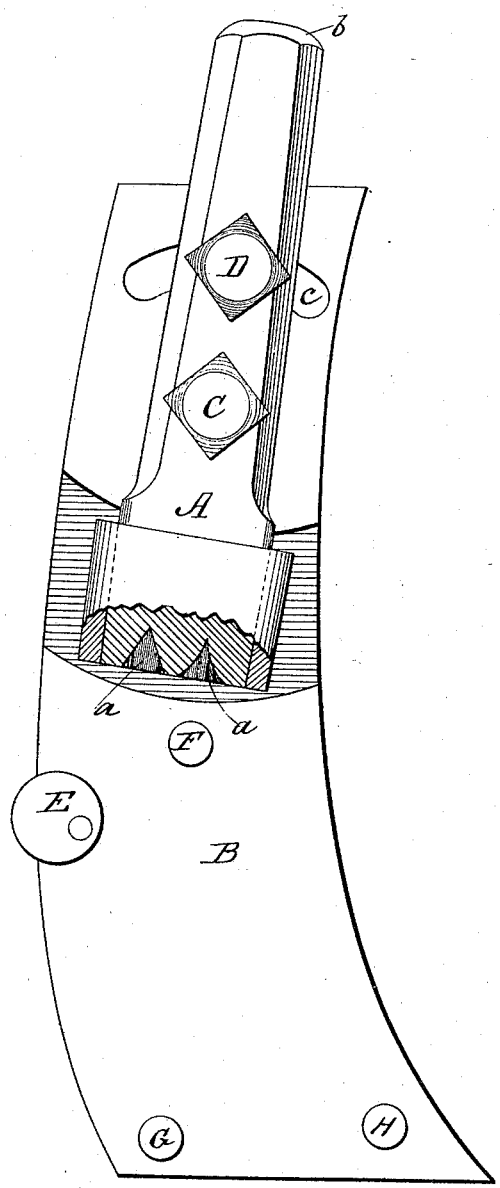
Figure 2:
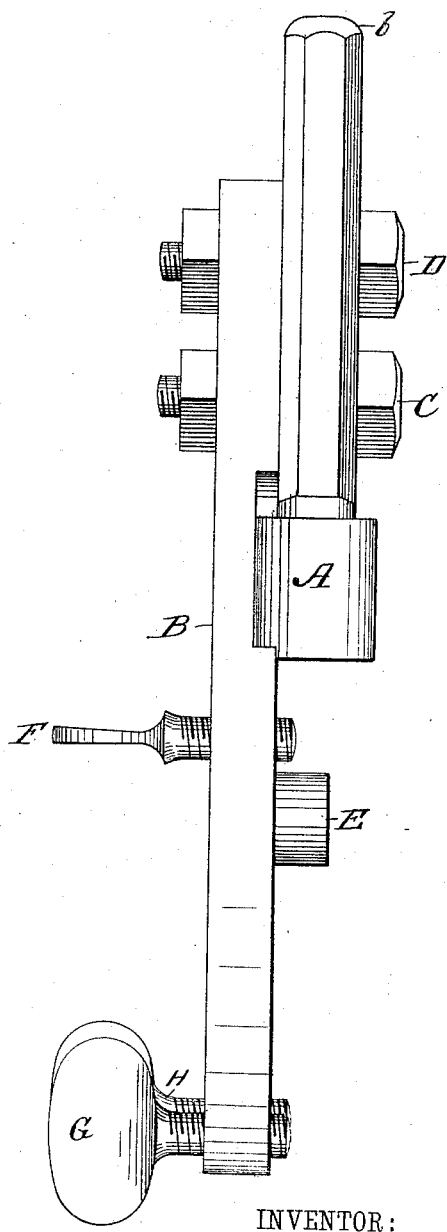

Figure 1 is a side elevation of my invention, part broken away to show the interior, and Fig. 2 is a front elevation of the same.

A represents a swage, consisting of a bar of steel having two notches, *a a*, in one end, of a form suitable to swage or spread the end of the saw-tooth as required, by hammer-blows applied on the head end *b*.

B is a plate, secured to the swage by two screw-bolts, C and D. The bolt C is a pivot on which the swage may turn to be set at different angles relative to a fixed stud, E. The bolt D passes through a slot, *c*, in the plate B to secure the swage at the desired angle. The slot *c* is the arc of a circle concentric with the pivot-bolt C.

F G H are thumb-screws passing through the plate B, to rest their ends against the face of the saw as a guide to set and keep the swage in the plane of the saw when in use. These screws fit very tightly in the plate B to keep them in place, for when once properly set they will not require to be changed, unless some peculiar set or pitch is required to be given to the saw-tooth.

In using the device the stud E is placed on top of the saw-tooth as a guide to enter it into the desired notch *a*. At the same time the three screws F G H are pressed to the saw-plate and the swage is ready to be struck with a hammer to do its work. Thus the teeth may be spread equally on both sides of the plate of the saw, and all the teeth may be made exactly alike without any special care. Twisting the saw-plate is obviated and the danger of breaking teeth is lessened. This guide would answer the purpose to some extent if the three screw-points F G H were substituted by fixed points or by a plane.

The stud E might be dispensed with under some circumstances, but its use produces more accurate work.

The swage A is an article of manufacture already on sale. It is provided with a band around the end, in which are the notches *a* to enable it to resist the shock of heavy blows. The swage is required to be very hard, while the band may be softer, and consequently less liable to break. I have adapted my guide-plate B to this commercial swage by making a segmental slot across the face of the said plate concentric with the pivot-bolt C, thus forming a path for the band just described to move in while the swage is being set for use.

The commercial swage described requires no alteration, except the drilling of two holes for the bolts C and D to adapt it to receive my guide-plate.

What I claim as my invention, and desire to secure by Letters Patent, is—

1. The combination of the swage A, provided with notches *a* in one end and a band around the said end, the side plate, B, provided with gage-points F G H, the pivot-screw C, passing through the swage into the said plate, and the binding-screw D, the plate B having a segmental groove across its face concentric with the bolt C and in the path of the said band, substantially as shown and described.

2. The combination, with the plate B, provided with bearings to rest against the side of a saw, as described, and with a curved slot, *c*, and the stud E, secured to the plate B, of the swage A, provided with notches *a*, and the bolts C and D, as shown and described.

WILLIAM C. B. HUMMEL.

Witnesses:
L. C. DEY,
GEO. C. BOWYER,
C. W. MYERS.